2 Sheets—Sheet 1.

C. HARRISON.

Drip-Tray for Water-Closet Bowl.

No. 8,189. Reissued April 23, 1878.

Witnesses:
Edw^d Payson
Geo. H. Miatt

Inventor:
Charles Harrison,
Per Edw. E. Lemby,
Atty.

N. PETERS, PHOTO-LITHOGRAPHER, WASHINGTON, D. C.

2 Sheets—Sheet 2.

C. HARRISON.

Drip-Tray for Water-Closet Bowl.

No. 8,189. Reissued April 23, 1878.

Witnesses:
Edwd Payson
Geo. W. Miatt

Inventor:
Charles Harrison,
Per Edw. E. Lumby,
atty.

N. PETERS, PHOTO-LITHOGRAPHER, WASHINGTON, D. C.

UNITED STATES PATENT OFFICE.

CHARLES HARRISON, OF NEW YORK, N. Y.

IMPROVEMENT IN DRIP-TRAYS FOR WATER-CLOSET BOWLS.

Specification forming part of Letters Patent No. 197,629, dated November 27, 1877; Reissue No. 8,189, dated April 23, 1878; application filed April 6, 1878.

*To all whom it may concern:*

Be it known that I, CHARLES HARRISON, of the city and State of New York, have invented a certain Improvement in Drip-Trays for Water-Closet Bowls, of which the following is a specification:

My improvement relates to that class of water-closet bowls in which the bowl is surmounted with a drip-tray which conforms in its outer shape to the opening in the woodwork surrounding the bowl, and is perforated with a hole having the shape of the upper end of the bowl.

Such trays have usually heretofore been made of lead, and it has also been proposed to make them in one piece with the bowl. The latter mode, however, makes the bowl very expensive and awkward to transport.

My invention consists in a drip-tray made of porcelain or other earthenware, preferably of the same material as the bowl, having a central opening provided with a downwardly-projecting flange. My tray is fitted to the top of the bowl, and thereby centralized and held in position by its own gravity; or it may be provided with brackets depending from the under side of the tray, and bearing upon the exterior of the bowl, and also provided with a grooved recess conforming in shape with a projecting tongue or bead formed around the upper end of the bowl, the tray being made thicker at the place where the recess is formed, for the purpose of giving it the necessary strength at that point. I may also provide ears or lugs upon the exterior of the bowl, which may be bolted or otherwise secured to the brackets projecting downward from the under side of the tray. I form a tight joint between the tray and the bowl by means of a soft-rubber gasket, or by means of plaster-of-paris, putty, or some other cementing material, which is deposited in the groove referred to prior to the seating of the tongue in the groove.

Figure 1:
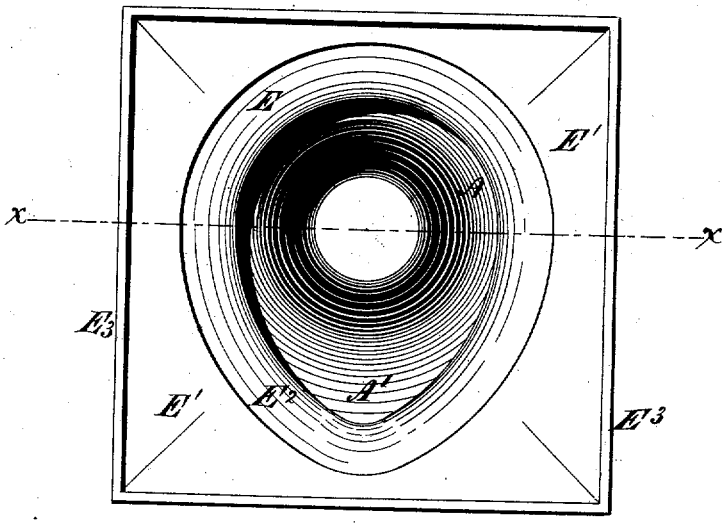
Figure 2:
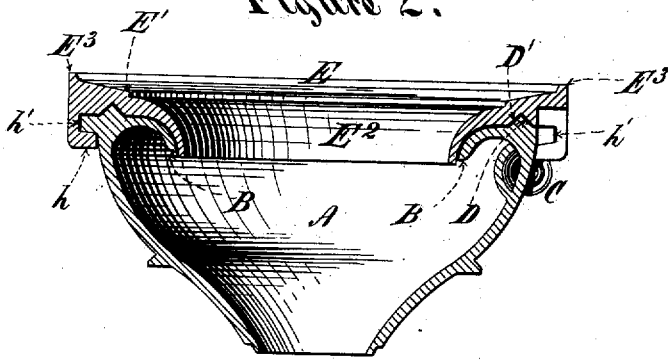
Figure 3:
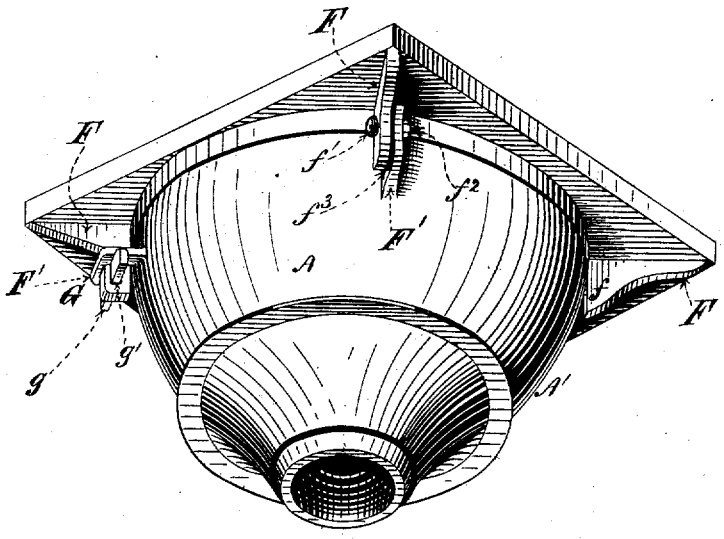

The accompanying drawings, illustrating my invention, are as follows:

Figure 1 is a top view of the tray, showing the interior of the bowl to which the tray is affixed. Fig. 2 is a vertical section through the line *x x* on Fig. 1. Fig. 3 is a perspective view, showing the under side of the bowl and tray, the brackets on the tray, and the lugs on the bowl, by means of which the tray is centralized and held down upon the bowl.

Referring to the drawings, it will be seen that the bowl A has a swelled front, A′, and is provided with the usual internal flange B, for the purpose of preventing overflow when water is admitted through the supply-pipe C. At or near the central portion of the upper edge of the bowl there is provided the annular-shaped tongue or bead D, which is intended to fit loosely into the correspondingly-shaped recess D′ formed in the under side of the tray E. Depending downward from the under side of the tray are four or more brackets, F. These brackets have a threefold object: first, to strengthen the tray; second, to bear upon the exterior of the bowl, and thus assist in centralizing the tray upon the bowl; and, third, to afford the means of bolting or otherwise securing the tray to the lugs F′ formed upon the exterior of the bowl.

The upper surface $E^1$ of the tray inclines from all sides toward the center, and the interior portion $E^2$, which forms the boundary of the opening in the tray, is a downwardly-projecting flange, which conforms to the shape of the upper end of the bowl, and overlaps the flange B. The tray is provided at its outer edges with the vertical flanges $E^3$. If desired, the surface of the tongue D and of the sides of the recess D′ may be left unglazed, for the purpose of enabling the cement used in the joint to take a more perfect hold of the two joining-surfaces.

Ordinarily the tray can be fastened to the bowl sufficiently by the use of plaster-of-paris, putty, or other cement between the tongue D and its seat in the groove D′, and it will, of course, be seen that, as the inner ends *f* of the brackets F bear upon the exterior of the bowl, they contribute to centralize the tray and protect it against dislodgment.

In some cases, however, it may be found desirable to further strengthen the connection of the tray with the bowl, and for this purpose the lugs F′ are formed upon the exterior of the bowl, in suitable position to allow of their being bolted to the brackets F by means of the bolt $f^1$ and the nut $f^2$. It may also be found desirable, if this mode of attachment is adopted, to interpose between the brackets F and the lugs F′ the elastic washer $f^3$.

It will, of course, be understood that the joint between the tray and the bowl may be made by a projecting bead or tongue upon the tray and a recess in the upper edge of the bowl; but the preferable mode of construction is that shown in the drawings, because there is then no opportunity for water to fall into the joint, as there would be if the recess were formed in the top of the bowl, and if, from any cause, water should get into the joint between the tray and the top of the bowl.

Instead of cement, a soft-rubber gasket may be used in the joint between the tray and the bowl, and in any case, if desired, the brackets and lugs may be so keyed together by a wedge as to compress the materials in the joint. To effect this result the lug on the bowl may be provided with a vertical hole, into and through which the lower extremity of the bracket is passed. In this case the bracket is provided with the slot *g*, for containing the key or wedge *g′*, which bears upon the under side of the lug, as shown at G in Fig. 3. Of course, it will be seen that brackets on the under side of the tray and lugs or ears projecting outward from the bowl afford various modes of holding the tray and bowl together—as, for example, the bracket may be provided with the lateral projection *h*, which catches upon the under side of the lug *h′*, as shown at H in Fig. 2. In the latter case the tray is pressed down upon the joint, and turned slightly to bring the projection *h* under the lug *h′*.

By means of my invention I am enabled to dispense with the lead trays heretofore used, and to provide a handsome porcelain drip-tray, which is detachable from the bowl, and is therefore susceptible of being easily and safely packed for transportation. Breakage of my tray does not involve the loss of the bowl, as it would if the tray were in one piece with the bowl.

I claim as my invention—

1. In combination with a water-closet bowl, a drip-tray, substantially such as described, having a central opening provided with a downwardly-projecting flange.

2. A water-closet bowl and a drip-tray, substantially such as described, connected together by a tongued and grooved joint, substantially as shown and described.

3. A drip-tray, substantially such as described, having a central opening conforming to the shape of the top of a water-closet bowl, and provided upon its under side with an annular projection conforming to the shape of the top of the bowl, for the purpose of affording an excess of material in which a recess can be formed without weakening the tray.

4. The brackets F, extending downward from the under surface of the tray, in combination with the bowl A.

5. The combination of two or more brackets, depending downward from the under side of a drip-tray, with two or more lateral projections or lugs formed upon the exterior of the water-closet bowl to which the drip-tray is applied, substantially as and for the purposes set forth.

6. A drip-tray, substantially such as described, and a water-closet bowl, connected together by a water-tight joint formed by the junction of two surfaces, portions of which are more or less curved or inclined, substantially as shown, and for the purposes set forth.

CHAS. HARRISON.

Witnesses:
M. L. ADAMS,
EDWD. PAYSON.